United States Patent [19]

Mitchell

[11] Patent Number: 4,697,861
[45] Date of Patent: Oct. 6, 1987

[54] GROMMET FOR CONNECTORS

[75] Inventor: Brian Mitchell, Canterbury, England

[73] Assignee: Amphenol Corporation, Wallingford, Conn.

[21] Appl. No.: 886,943

[22] Filed: Jul. 22, 1986

Related U.S. Application Data

[63] Continuation of Ser. No. 701,469, Feb. 14, 1985.

[30] Foreign Application Priority Data

Feb. 16, 1984 [GB] United Kingdom ............... 8404107

[51] Int. Cl.⁴ ............................................. H10R 4/00
[52] U.S. Cl. .................................... 439/271; 439/449; 439/587
[58] Field of Search ........................ 339/60, 61, 94, 59, 339/103 R, 103 M, 103 B

[56] References Cited

U.S. PATENT DOCUMENTS

| | | | |
|---|---|---|---|
| 2,304,870 | 12/1942 | Yost | 339/94 R |
| 2,619,515 | 11/1952 | Doane | 339/94 M |
| 2,750,573 | 6/1956 | Mika | 339/94 R |
| 4,166,664 | 9/1979 | Herrmann, Jr. | 339/60 M |
| 4,173,349 | 11/1979 | Neale, III | 339/60 C |
| 4,241,967 | 12/1980 | Collins | 339/59 M |
| 4,375,011 | 2/1983 | Grunau | 174/655 S |
| 4,460,227 | 7/1984 | Ball | 339/94 M |

FOREIGN PATENT DOCUMENTS

| | | |
|---|---|---|
| 0023436 | 2/1981 | European Pat. Off. . |
| 0039447 | 4/1981 | European Pat. Off. . |
| 2835832 | 8/1978 | Fed. Rep. of Germany . |
| 3201324 | 7/1983 | Fed. Rep. of Germany .... 339/94 R |
| 262532 | 12/1926 | United Kingdom . |
| 1346297 | 2/1974 | United Kingdom . |
| 1458897 | 12/1976 | United Kingdom . |
| 1538058 | 1/1979 | United Kingdom . |
| 2019131 | 10/1979 | United Kingdom . |
| 2027932 | 2/1980 | United Kingdom . |
| 1602435 | 11/1981 | United Kingdom . |

Primary Examiner—Gil Weidenfeld
Assistant Examiner—David Pirlot
Attorney, Agent, or Firm—Bacon & Thomas

[57] ABSTRACT

A connector for optical fibre or electrical cables includes a grommet having a body of resilient silicone rubber having at least one bore extending therethrough. Two annular sealing webs extend from the wall of the bore. Each web extends both radially-inwardly and axially of the bore so as to be of generally conical configuration. The web is shaped so that its axial thickness is greater at its free edge than where it joins the wall of the bore and so that it defines a cylindrical sealing surface coaxial with the bore. The configuration and resilience of each web are such that the free edge of the web can sealingly engage a member of relatively small cross-section, for example, an electrical or optical fibre cable, but the web is deformable to permit the passage of a member of relatively large cross-section, for example, a contact or terminating member at the end of the cable, through the bore. Furthermore, the resilience and configuration of each web are such that the web can sealingly engage a cable passing through the bore even when the web is inverted so that it extends axially of the bore in the opposite direction relative to the body.

5 Claims, 4 Drawing Figures 4,697,861

GROMMET FOR CONNECTORS

This application is a continuation of application Ser. No. 701,469 filed Feb. 14, 1985.

BACKGROUND OF THE INVENTION

1. Field of the Invention

The invention relates to grommets, in particular, to the type of grommet used to seal the entry of wires, cables, optical fibres or the like into the body of a connector used to join them to other similar wires, cables, or fibres.

2. Description of the Prior Art

There are in existence a large number of such connectors in which each part of the connector consists in essence of a hollow connector shell, housing at its forward end a block of dielectric or other material in which are formed a number of longitudinally-extending bores. The electrical contact members or optical fibre terminating members are supported and retained in these bores. At the rear of the connector shell, where the wires or fibres secured to the contact or terminating members enter it, they pass through a grommet of plastics or rubber. The grommet is sealed to the interior of the connector shell around its outer periphery and has a number of openings formed in it which are aligned with the bores at the forward end of the connector. The cables or fibres pass through these openings, each of which is provided with at least one inwardly-directed V-section sealing lip which engages the cable or fibre to seal the interior of the connector against the entry of dirt or moisture. One such connector is described, for example, in United Kingdom Patent No. 1 563 077.

In connectors of this kind it is usual for the contact or terminating members to be permanently secured to the ends of the cables or fibres, the connectors being constructed so that the cables and their attached terminating members can be inserted into or removed from the connector shell at will. It is, therefore, necessary that the grommet should be sufficiently resilient to permit entry of a terminating member whose external diameter is considerably larger than that of the attached cable whilst still forming an adequate seal against the outside of the relatively small diameter cable. Although existing grommets can fulfil both these functions where the diameter of the terminating member is not much greater than that of the cable, an adequate seal is not formed in cases where the cable diameter and the diameter of the terminating member differ greatly.

One existing solution to this problem involves the use of a two-part grommet. The grommet part sealed to the connector shell is similar in form to conventional one-part grommets except that the openings formed in it are sufficiently large to enable the terminating members to pass freely through them into the connector shell. The second part of the grommet in the form of a sleeve or "boot" is threaded on the cable to the rear of the terminating member so that it can be slid into the opening in the main grommet part to fill the space around the cable and seal the interior of the connector shell against dirt and moisture.

Whilst two-part grommets of this kind are satisfactory for many applications, they are more expensive to manufacture than one-part grommets and they have the disadvantage that the sleeve or "boot" must be threaded onto the cable before the terminating member is fitted. In addition, in the case of connectors for use in military or aerospace applicators, it is desirable that the connectors can be serviced in a wide variety of situations. The necessity for a sleeve or boot which can be detached from the connector and lost relatively easily is, therefore, clearly disadvantageous in connectors for use in applications of this kind.

SUMMARY OF THE INVENTION

In accordance with a first aspect of the invention, there is provided a connector for electricl or optical fibre cables, a grommet comprising a body having at least one bore extending therethrough; at least one annular sealing web of resilient material extending from the wall of the bore both radially-inwardly and axially of the bore so as to be of substantially conical configuration; the resilience and configuration of the web being such that the free edge of the web can sealingly engage a cable of relatively small cross-section and is deformable to permit the passage of a terminating member of relatively larger cross-section through the bore.

A grommet of this kind may be capable of permitting the insertion of a terminating member into the connector and still providing a good seal around the attached cable even when the difference between the diameters of the terminating member and of the cable is relatively large, for example, when the ratio of the two diameters is of the order of 2:1. Furthermore, such a grommet can be relatively inexpensive to manufacture and need not involve the user in further assembly once the terminating members have been inserted into the connector, as do existing two-part grommets.

In existing grommets, the seal between the grommet and a cable passing through the grommet opening may be broken if, for any reason, the cable moves in an axial direction relative to the grommet opening. This problem arises because friction between the sealing lips or webs in the grommet opening tends to cause the edge of the lips or webs to move with the cable so that the lips become deformed and can no longer engage the cable to form a proper seal. Similar problems arise when the contact or terminating members are inserted into the connector shell by means of a well-known tool which takes the form of a tapered tube which surrounds the cable and bears against a rearwardly-facing surface on the contact or terminating member. The tool and terminating member are inserted through the grommet opening together and, once the terminating member is in position in the connector shell, the tool is then withdrawn. Again, frictional engagement of the sealing lips or webs of the grommet tends to cause the lips to follow the rearward movement of the tool so that they become deformed and cannot properly engage the In accordance with a second aspect of the invention there is provided a connector for electrical or optical fibre cables, a grommet comprising a body having at least one bore extending therethrough; at least one annular sealing web of resilient material extending from the wall of the bore both radially-inwardly and axially of the bore so as to be of substantially conical configuration; the resilience and configuration of the web being such that the web can also sealingly engage a cable when the web is inverted so that it extends axially of the bore in the opposite direction relative to the body.

Thus, even if the sealing webs of the grommet are deformed to the extent that they have become completely inverted due to rearward movement of the cable or withdrawal of the insertion tool, the grommet may be capable of providing an effective seal against the entry of dirt or moisture into the connector shell. Preferably, the web is so shaped that its dimension measured axially of the bore is greater at its free edge than the axial dimension of the web where it meets the wall of the bore. This configuration facilitates flexing and inversion of the sealing web.

In conventional grommets having a V-shaped sealing lip, the only contact between the grommet and the cable is along a relatively narrow zone at the vertex of the lip but a grommet provided with a conical sealing web of the kind described above has the additional advantage that the area of contact between the grommet and the cable is relatively large and should, therefore, form a more effective seal.

In accordance with a further aspect the invention also provides a connector for electrical or optical fibre cables, a grommet comprising a body having at least one bore extending therethrough; at least one annular sealing web of resilient material extending from the wall of the bore both radially-inwardly and axially of the bore so as to be of substantially conical configuration; the web being shaped to define at its free edge a cylindrical sealing surface coaxial with the bore, and the dimension of the web measured axially of the bore at its free edge being greater than the axial dimension of the web where it meets the wall of the bore.

DESCRIPTION OF THE PREFERRED EMBODIMENT

Figure 1:
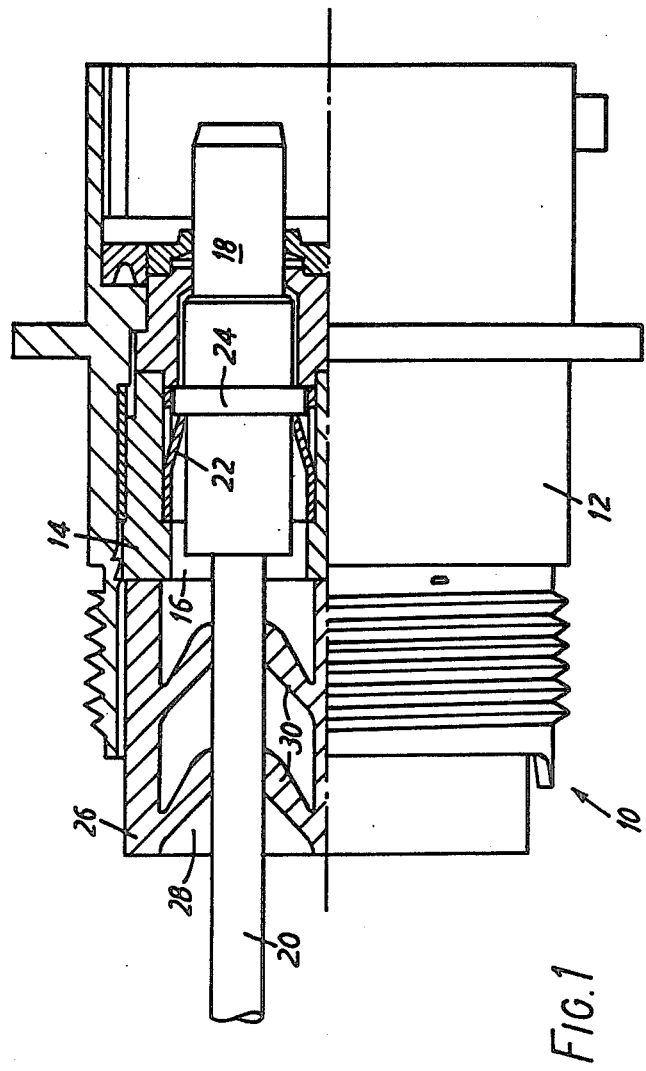
FIG. 1 is a part section through a connector part incorporating a grommet in accordance with the invention.

The connector part is of the general type described above. That is, it comprises a generally cylindrical connector shell 12 which houses at its forward end a cylindrical block 14 of dielectric or other rigid material in which are formed a plurality of circular-section bores 16 extending longitudinally of the shell 12. Each bore 16, only one of which is shown, contains a contact or terminating member 18 attached to the end of an electrical or optical fibre cable 20. The terminating member 18 is inserted into the bore 16 from the rear of the connector shell 12 and is retained, in place in the bore 16 in a conventional manner by spring tines 22 which bear against an annular flange 24 provided on the terminating member 18.

At the rear of the connector shell 12 is a circular grommet 26 of suitable elastomeric material. The outer periphery of the grommet 26 is sealed to the internal surface of the connector shell 12 in any convenient manner and the grommet 26 is formed with a plurality of bores 28 which are aligned with the bores 16 which receive the terminating members 18 at the forward end of the shell 12.

Figure 2:
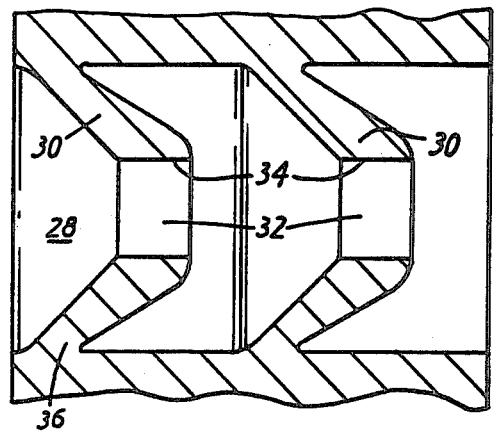
FIG. 2 is a fragmentary sectional view of a bore of the grommet of FIG. 1.

Each of the bores 28 in the grommet 26 is provided with two moulded sealing webs 30 whose configuration is shown in greater detail in FIG. 2.

Each web 30 extends both radially-inwardly and axially of the bore 28 at an angle of approximately 45° to the bore wall so that it is generally conical (or, more strictly, frusto-conical) in shape. The free edge of the web 30 defines a circular opening 32 through which the cable 20 extends in use. The unstressed diameter of the opening 32 is considerably less than the diameter of the cable 20 around which it is intended to form a seal. For example, where the cable diameter is of the order of 157–160 thou (3.99–4.06 mm) the unstressed diameter of the opening 32 in the web 30 is around 90–95 thou (2.29–2.41 mm). Also the webs 30 are shaped so that the thickness of the web 30 measured in a direction parallel to the axis of the grommet bore 28 increases from the peripheral root of the web towards the free edge of the web 30 and so that the surface 34 of the web 30 defining the opening 32 extends parallel to the bore axis. This shape permits the web 30 to flex freely about its root 36 where it joins the wall of the bore 28 whilst providing a relatively large sealing surface 34.

The elasticity of the material of which the grommet 26 is made permits the terminating member 18 to pass through the opening 32 but once the member 18 is clear of the webs 30 they return to their unstressed shape and the edge surfaces 34 engage the outer surface of the cable 20 to form a seal to prevent dirt or moisture entering the connector shell 12. Even in cases where the external diameter of the terminating member 18 is approaching twice that of the cable 20, the grommet 26 may provide a good seal on the cable surface whilst allowing the larger terminating member 18 to be inserted through the grommet 26 into the connector shell 12.

The material of which the grommet 26 is made must, of course, be sufficiently elastic to allow the relatively large cross-section terminating member to enter the connector shell 12 but at the same time it must be sufficiently resilient to form an effective seal around the relatively small diameter cable. One material which is particularly well-suited to the manufacture of such grommets is silicone rubber which can provide the required degree of elasticity and resilience throughout the working life of the connector. Neoprene rubber may also be used but is less satisfactory as it may give rise to problems due to outgassing and subsequent hardening. Whatever material is chosen, it is essential that the sealing webs do not assume a permanent position when used with a large diameter cable.

Figure 3:
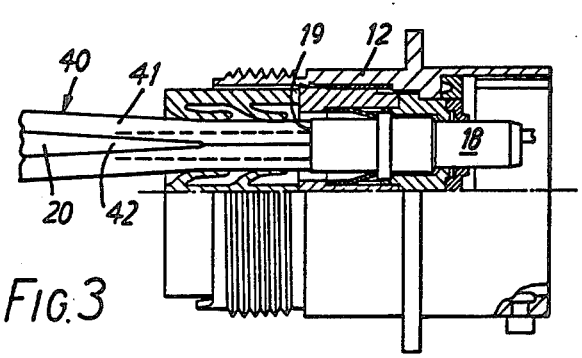
FIGS. 3 and 4 are part sectional views through the connector part of FIG. 1 illustrating the insertion of a terminating member by means of a conventional tool.

As mentioned above, the terminating members 18 may be inserted into the connector shell 12 by means of a tool 40 of a kind which is well known. Basically the tool 40 consists of a tapering tube 41 of resilient plastics material which has a longitudinally extending slot 42 to permit a cable 20 to be inserted into it. The narrow forward end of the tool 40 bears against either the rear surface 19 of the terminating member 18 as shown in FIG. 3 or against the annular flange 24, according to whether the member 18 is being inserted or removed. The tool 40 is such that when used to remove the terminating member it forces aside the spring tines 22 to permit the terminating member 18 and tool 40 together to slide past them. When the tool 40 is used to insert the terminating member 18 it prevents the terminating member becoming misaligned with the bores 16.

Figure 4:
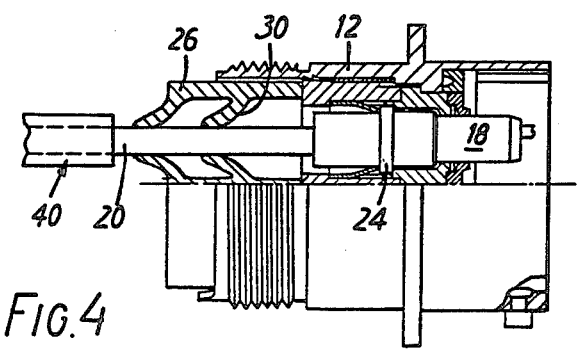

When a terminating member 18 is inserted into the connector shell 12 using the tool 40 the webs 30 of the grommet 26 are stretched and forced outwards to allow the tool 40 to pass through. Once the terminating member 18 is in position, the tool 40 is withdrawn. Due to the frictional engagement between the webs 30 and the outside of the tool 40, the innermost edges of the webs 30 tend to be dragged rearwardly with the tool until eventually they may become completely inverted as shown in FIG. 4. That is, the conical webs 30 may come to extend axially of the bore 28 but in the opposite direction to that illustrated in FIG. 1. Inversion of the webs 30 may also occur if the cable 20 around which they form a seal moves axially of the bore 28 in such a direction as to tend to withdraw the terminating members 18 from the connector shell 12. Again this is due to the fact that the edges of the webs 30 grip the outer covering of the cables.

However, due to configuration of the webs 30 and the resilience of the grommet material, the cylindrical surfaces of the webs 30 can engage the outside of the cable 20 so as to form an effective seal even when the webs 30 are completely inverted. In particular, the webs 30 are shaped so that their thickness, measured in a direction parallel to the axis of the bore 28, is considerably less at the junction 36 of the web 30 with the bore wall than the axial thickness of the web 30 at its free edge. This enables each web 30 to flex about the junction 36 with the bore wall into the inverted position of FIG. 4 relatively easily whilst still retaining a large sealing surface 34.

Whilst in the embodiments shown, each bore 28 of the grommet 26 is provided with two webs 30, it should be appreciated that each bore may have a single web or, if the conditions against which the connector shell is to be sealed are more sever, three or more webs. The grommet is particularly suitable in relation to multipin connectors but can also be applied to optical fibre connectors as well as electrical connectors.

I claim:

1. In a connector for electrical or optical fibre cables, said cables having a terminating member at one end thereof, and a grommet mounted in said connector and adapted to seal said cable after said terminating member is inserted therethrough, the improvement comprising:

said grommet comprising a body having a cylindrical inner wall and at least one annular sealing web of resilient material extending radially inwardly from said inner wall and having a substantially conical configuration normally facing in one axial direction, said web having a central bore defined by a cylindrical substantially flat surface coaxial with the inner wall and being defined by two substantially flat surfaces each extending from said wall at a different angle than the other and terminating at said substantially flat sealing surface and surrounding said bore, the thickness of said web measured axially of said bore and radially inwardly from the inner wall being greater adjacent to the cylindrical sealing surface than the thickness of said web adjacent to said inner wall due to said flat surfaces extending at said different angles so that said web is deformable axially adjacent to said inner wall to permit the passage of a terminating member of relatively large cross-section through said bore in a first axial direction and in a second, opposite axial direction and inversion of the cone if the web is pulled from one of said first or second axial directions to the other of said first or second axial directions, and said cylindrical sealing surface being adapted to coaxially expand radially outwardly and sealingly engage 360° of an axial portion of a cable of relatively small or large cross-sectional diameter.

2. The connector according to claim 1, wherein a plurality of said sealing webs are provided in each bore.

3. The connector according to claim 1, wherein said sealing web is formed of silicone rubber.

4. The connector according to claim 1, wherein said sealing web extends from said inner wall at an angle of approximately 45 degrees.

5. The connector according to claim 1, wherein said grommet is formed as a unitary structure.

* * * * *